April 28, 1970     P. M. CHRISTENSEN ET AL     3,509,514
CONNECTION MEANS FOR ELECTRICAL BUS BARS
Filed March 26, 1968
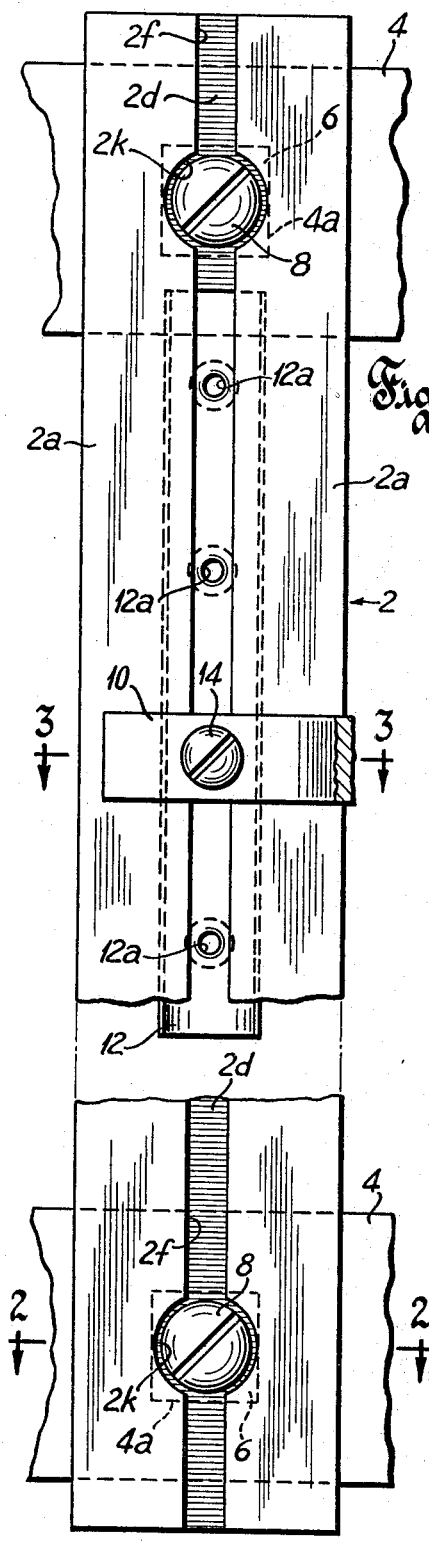
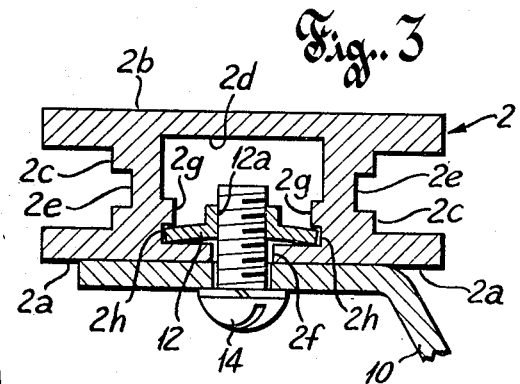
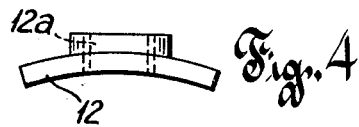
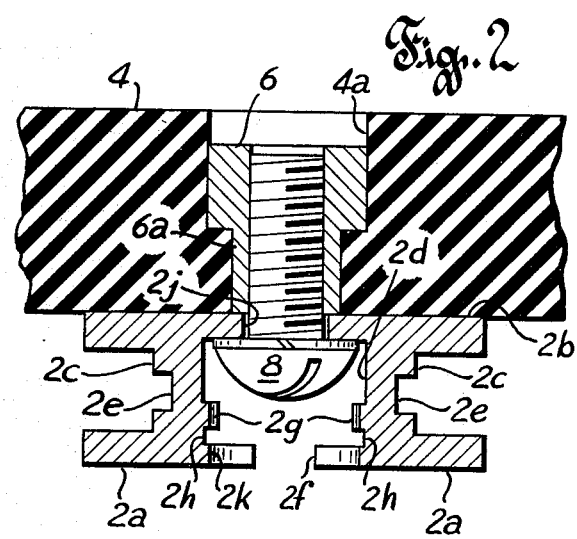
Inventors
Paul M. Christensen
Martin F. Koenig
By H. R. Rather
Attorney 
United States Patent Office 3,509,514
Patented Apr. 28, 1970

---

3,509,514
CONNECTION MEANS FOR ELECTRICAL BUS BARS
Paul M. Christensen, West Orange, N.J., and Martin F. Koenig, Milwaukee, Wis., assignors to Cutler-Hammer, Inc., Milwaukee, Wis., a corporation of Delaware
Filed Mar. 26, 1968, Ser. No. 716,074
Int. Cl. H01r 3/04
U.S. Cl. 339—22                                 5 Claims

ABSTRACT OF THE DISCLOSURE

An extruded aluminum bus bar having a longitudinal groove for trapping an elongated steel strap having a multiplicity of regularly spaced tapped holes therein. The tapped holes are exposed through a slot in the front surface of the bus bar to receive the individual bolts of various connector assemblies to effect a clamping connection to the bus. The strap has an arcuate transverse cross-section to provide a spring washer effect for the individual connection points.

BACKGROUND OF THE INVENTION

This invention relates to electrical conducting bus bars of extruded construction which are particularly well suited for use in panelboard and switchboard installations, and specifically to an improved means for effecting electrical connections thereto.

The introduction of the aluminum bus bar has presented certain problems with respect to the methods on which electrical connections may be made along the bus. A more specific aspect of this problem is present in bus bars which are intended for use primarily in the class of electrical apparatus referred to as panelboards or switchboards wherein the locations for such connections are of fixed, predetermined location and spacing.

A common prior art expedient in providing such bus bars was to form a plurality of tapped holes in the bus at the required intervals to directly receive a bolt therein. The strength and mechanical characteristics of such a threaded joint in aluminum is not always satisfactory for such construction, especially when exposed to the heating and cooling cycles encountered in such applications.

The properties of aluminum render it well suited for extrusion processes in manufacture and extruded bus bars have been formed which have a longitudinal T-shaped groove to afford a "bed-rail" type of connection thereto such as those shown in United States Patent Nos. 3,210,716 and 2,969,421. Individual connectors are secured to the front surface of the bus bar by a clamping assembly comprising a bolt exposed to the front which draws up a clamp member carried in the groove. For fixed location apparatus, the use of individual connector assemblies requires the builder to space each assembly from the next adjacent assembly by means of a gauge block or the like. Since each space along the panelboard is not always used in exact sequence, the nearest installed assembly may be several spaces away and measurement thereto may require a number of gauges.

SUMMARY

It is therefore an object of this invention to provide a connection assembly wherein the placement of a first assembly automatically provides an exact spacing for future assemblies.

It is a further object of this invention to provide a connection assembly wherein one of the members thereof is common to serve a multiplicity of such assemblies.

It is a further object of this invention to form the aforementioned common member of such assemblies to a shape in which it effectively compensates for expansion and contraction of the conductor members for each individual connection assembly.

These and other objects will become more readily apparent in the following specification and claims when read in conjunction with the drawings.

DESCRIPTION OF THE DRAWING

FIGURE 1 is a front view of a bus bar construction in accordance with this invention;

FIG. 2 is a cross-sectional view drawn to a somewhat greater scale and taken along the line 2—2 of FIG. 1 to show a means of mounting the bus bar to an insulating support of panel member;

FIG. 3 is a cross-sectional view, also drawn to a greater scale and taken along the line 3—3 of FIG. 1 to show the electrical connection means of this invention; and FIG. 4 is an end view of one member of the electrical connection means shown in FIGS. 1 and 3 and also drawn to a scale greater than that of FIG. 1.

DESCRIPTION OF THE PREFERRED EMBODIMENTS

Referring to the drawings, and particularly FIG. 1 thereof, there is shown an electrical bus bar 2 constructed in accordance with the invention. Bus bar 2 is particularly designed for use in an electrical panelboard or switchboard and thus its length may be on the order of five to six feet. In this respect, a portion of the bus bar 2 has been broken away intermediate the ends thereof in FIG. 1 to facilitate the drawings.

Bus bar 2 is constructed from a good electrical conducting material such as aluminum and preferably formed by an extrusion process. The bus bar may be extruded of indefinite length and subsequently cut to whatever length is required for its final employment.

The cross-sectional configuration of the extruded bus bar 2 is best shown in FIG. 3. This cross-sectional configuration is uniform throughout the length of the bus bar as extruded, and for the most part, as it is in final form. Certain machining operations are performed on the bus subsequent to its extrusion, and this will be brought out in greater detail hereinafter.

With reference particularly to FIG. 3, it may be seen that bus bar 2 comprises a pair of planar front and rear portions 2a and 2b, respectively, which are joined together by a pair of spaced sidewalls 2c to define a substantially rectangular cavity 2d. The front and rear portions 2a and 2b extend beyond the sidewalls 2c to either side of the bus bar 2 to provide maximum surface for electrical connections and to increase the heat dissipating surface of the bus bar. To further increase the heat dissipating surface of the bus bar, a pair of grooves 2e are formed in the exterior portions of the sidewalls 2c to extend longitudinally of the bus.

Front portion 2a of the bus bar 2 is divided into two separate portions by a longitudinal slot 2f formed midway between the sidewalls 2c and extending along the entire length of the bus bar 2. Within the cavity 2d, a pair of inwardly extending rail portions 2g are formed on the interior surfaces of the sidewalls 2c. The rails 2g cooperate with the inner surfaces of the respective front portions 2a and the side walls 2c to form a pair of oppositely disposed shallow, longitudinally extending grooves 2h within the cavity 2d.

The bus bar of the foregoing configuration is cut to its desired length. Mounting holes 2j (FIG. 2) are subsequently formed in the rear portion 2b to communicate between the cavity 2d and the exterior rear surface of the bus bar. The front portion 2a of the bus bar is provided with substantially circular clearance openings 2k which are in axial alinement with the mounting holes 2j. Clearance openings 2k communicate with the slot 2f to appear as arcuate widenings of the slot in these areas. It may be seen in FIG. 2 that the openings 2k also extend through the rails 2g.

The bus bar is shown in FIGS. 1 and 3 as being mounted upon a pair of insulating support members 4. These members have a rectangular cavity 4a formed in the rear surface thereof into which may be placed a rectanguularly shaped nut 6. To achieve maximum thread engagement, the nut 6 may be further provided with a cylindrical extension 6a which extends to the front surface of the support 4 through a cylindrical opening in the support leading to and communicating with the rectangular opening 4a thereof. A screw 8, together with a lockwasher, is inserted through the openings 2k and 2j and threaded into the nut 6 to secure the bus bar to the support, such attachment being accomplished from the front of the bus bar. While the drawings show the bus bar as being mounted only at two points, i.e., adjacent each end thereof, it is to be understood that additional mounting holes and supports may be provided along its length as required for the various length bus bars.

A tap-off terminal member 10 is shown connected to the bus bar 2 in FIGS. 1 and 3. Such member may be a bolt-on terminal of a circuit controlling device, a stab-on contact post, a branch connector or other such device for taking current from the bus bar. To provide for a good electrical joint as well as the required mechanical connection which may be accomplished entirely from the front of the bus bar, a connector strap 12 is provided for the bus bar. Strap 12 is an elongated member of arcuate cross-section (FIGS. 3 and 4) and preferably formed of spring steel. Strap 12 has rearwardly extruded openings 12a spaced at regular intervals along its length as dictated by the spacing required for panelboard and switchboard installations. The openings 12a are subsequently tapped to provided threaded apertures for receiving connection screws 14.

Strap 12 may be of the same length as the bus bar 2 or cut to shorter lengths such as that shown in the drawings. When shorter lengths are used, the distance from the end to the first hole 12a is exactly one half the distance between two adjacent holes 12a so that a second identical strap may be butted against the first one to maintain the proper spacing between the holes.

Strap 12 is inserted with the grooves 2h of bus bar 2 from one end thereof with the concave side of the strap facing the front portions 2a of the bus bar. The terminal member 10 is placed on the front portion 2a of the bus bar to extend transversely of the slot 2f. The connecting screw 14 is then inserted through a clearance hole in the terminal member and the slot 2f and threaded into one of the openings 12a of strap 12. As screw 14 is turned into the strap to a prescribed torque, the arcuate strap 12 is drawn outwardly toward the front to provide a compressive joint between the terminal member 10 and the front surface of the bus bar 2 to compensate for the expansive and contractive forces of the joint due to varying amounts of current flow and temperature coefficients of the materials. The amount the strap 12 is compressed may vary according to choice of materials, but in the preferred construction the strap is drawn up to reduce the height of its concave offset to one-half the relaxed value.

While not specifically shown herein, it is to be understood that the strap 12 may be further provided with opposed slots at its edges extending transversely inwardly thereof in the areas between the threaded openings 12a to individualize the compression effects of the strap to each joint connection. In panelboard constructions the spacing between the holes 12a is of sufficient length so as the use of such slots is not deemed essential.

While the foregoing illustrates and describes a preferred embodiment of the invention, it is to be understood that the invention is susceptible of various modifications.

We claim:

1. Attachment means for securing a plurality of terminals, branch connectors or the like to an electrical condutor at spaced, predetermined locations along the length thereof comprising, in combination:

a hollow electrical bus bar having a longitudinal slot in a front portion thereof communicating between the interior surfaces of said bus bar throughout its length;

an elongated strap member inserted within said bus bar, said strap member having an arcuate transverse cross section, said strap member having the concave surface thereof presented toward said front portion of said bus bar;

a plurality of regularly spaced, threaded apertures formed along the length of said strap member at said predetermined locations, said apertures being alined with said slot in said front portion of said bus bar when said strap is positioned therein;

at least one terminal member placed on said front portion of said bus bar and extending across said slot; and at least one threaded fastener means engaging an outer surface of a respective terminal member at one end and threadably engaging a respective one of said apertures in said strap at the opposite end thereof, rotation of said fastener means in one direction causing said terminal member and said strap member to be drawn together to compress the latter in the area of said one of said apertures and to clamp said terminal to said bus bar to positively position said strap to fix the locations of said remaining apertures.

2. The combination according to claim 1 wherein additional terminal members are secured to said bus bars at selected ones of said predetermined locations by means of additional threaded fastener means engaging the outer surface of respective ones of said terminal members and threadably engaging respective ones of said apertures in said strap member, rotation of said fastener means in one direction causing the respective terminal members and the respective portions of said strap member to be drawn together to compress those portions of said strap member in the areas of said respective ones of said apertures to clamp said respective terminals to said bus bar.

3. The combination according to claim 1 together with postioning means on the interior of said bus bar for engaging the lateral edges of said strap member to position the latter adjacent the front portion of said bus bar.

4. The combination according to claim 1 wherein a plurality of said elongated strap members are inserted within said bus bar in abutting end-to-end engagement and wherein the distance between the endmost apertures and the respective ends of each of said straps is one-half the distance between two adjacent apertures in said straps to provide positive means for positioning said plurality of straps to fix the locations of the apertures therein.

5. The combination according to claim 1 wherein said elongated strap is provided with a plurality of pairs of oppositely disposed slots along the lateral edges thereof, one pair of slots being positioned midway between each of said adjacent threaded apertures to extend transversely inwardly of said strap, whereby compressive deformation of said strap at one aperture will not cause deformation of said strap at an adjacent aperture.

References Cited

UNITED STATES PATENTS 3,210,716   10/1965   Meacham _____ 339—21
3,398,496   8/1968   Mischke _____ 52—463

FOREIGN PATENTS 122,607   8/1948   Sweden.

RICHARD E. MOORE, Primary Examiner
J. H. McGLYNN, Assistant Examiner

U.S. Cl. X.R.
151—41.76, 38; 174—72